United States Patent [19]

Buhrer et al.

[11] Patent Number: 4,953,938
[45] Date of Patent: Sep. 4, 1990

[54] OPTICAL FIBER EXPANDED BEAM CONNECTOR

[75] Inventors: Carl F. Buhrer, Framingham; Alfred H. Bellows, Wayland, both of Mass.

[73] Assignee: GTE Laboratories Incorporated, Waltham, Mass.

[21] Appl. No.: 791,669

[22] Filed: Oct. 28, 1985

[51] Int. Cl.⁵ .............................................. G02B 6/32
[52] U.S. Cl. ............................. 350/96.18; 350/96.21; 425/443; 425/808
[58] Field of Search ............... 350/96.18, 96.20, 96.21, 350/96.22, 96.34; 425/808, 442, 443

[56] References Cited

U.S. PATENT DOCUMENTS

| | | | |
|---|---|---|---|
| 121,496 | 12/1871 | Derrick | 425/442 X |
| 707,299 | 8/1902 | Chase | 425/443 X |
| 3,880,452 | 4/1975 | Fields | 350/96.21 X |
| 3,947,182 | 3/1976 | McCartney | 350/96.22 |
| 4,110,002 | 8/1978 | Klein et al. | 350/96.34 X |
| 4,367,012 | 1/1983 | Ikeda et al. | 350/96.34 |
| 4,531,702 | 7/1985 | Plummer | 425/808 X |
| 4,534,616 | 8/1985 | Bowen et al. | 350/96.18 X |

FOREIGN PATENT DOCUMENTS 60-42719  3/1985  Japan ................................. 350/96.2

Primary Examiner—John D. Lee
Attorney, Agent, or Firm—James J. Cannon, Jr.

[57] ABSTRACT

An expanded beam connector for optical fibers uses a transparent lensing device having integral alignment capability, that of a simplified design that facilitates its molding with high precision from optical plastic or glass.

10 Claims, 5 Drawing Sheets

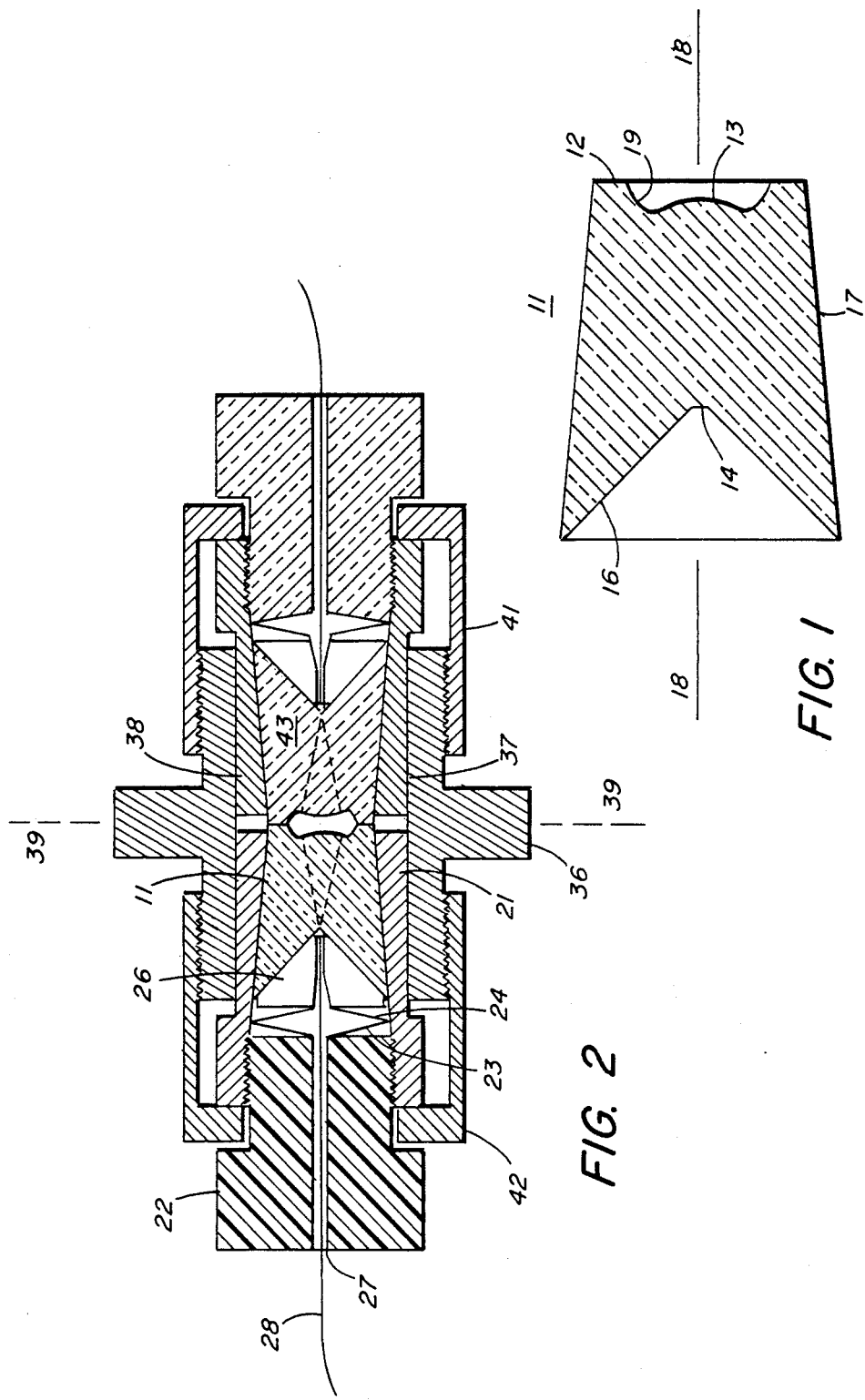

OPTICAL FIBER EXPANDED BEAM CONNECTOR

BACKGROUND OF THE INVENTION

1. Field of the Invention

This invention relates to optical fiber expanded beam connectors and, in particular, to an integral lensing and alignment device for an optical fiber. The invention is further directed to a multi-piece mold for such a device, and to a generally truncated conical elastomeric washer for holding and centering an optical fiber. Furthermore, the invention is also directed to a fiber optic expanded beam connector assembly. Accordingly, it is a general object of this invention to provide new and improved devices, molds, washers and assemblies of such character.

2. General Background

The coupling of two optical fibers to achieve maximum transmission of light between them may be accomplished by a direct end to end alignment or by use of intermediate focusing optics. In the latter approach, the light wave is expanded in cross-section so that it is possible to relax the transverse alignment accuracy requirement and also to have a connector that is less susceptible to contamination upon repeated connections and disconnections. U.S. Pat. No. 4,421,383 by W. John Carlsen, issued Dec. 20, 1983, entitled "Optical Fiber Connectors", describes such an optical fiber connector in which the convex lens surface, a forward flat reference surface, and a focal plane surface are integrally molded in an optical quality plastic component. Transverse location of the fiber end at the focal point on the focal plane is achieved by means of an elastomeric centering device as described in U.S. Pat. No. 4,391,487 by Paul Melman and W. John Carlsen, issued July 5, 1983 and entitled "Optical Fiber Centering Device". This centering device utilizes a cylindrical recess in a transparent plastic component. Additional final alignment can be achieved through the use of a truncated conical indentation to further center the end of the fiber, as described in Optical Spectra, October 1980, pp. 41, 42, article entitled "Connectors at Stretch" by Carlsen and Melman.

The outer surface of the optical plastic connector body part, as shown in the aforesaid Carlsen patent, U.S. Pat. No. 4,421,383, is essentially cylindrical with the addition of configurations for holding a pair of such components in an expanded beam connector. Such configurations can include, for example, chamfers, raised rings or other types of flanges. Disadvantageously, however, such cylindrical surfaces complicate the design of a mold necessary for forming the optical quality transparent material, such as plastic or glass, into shape. Further, to mold an internal cylindrical recess with a fiber location detent at its bottom would require a die insert pin having a conical point on its end to reproduce such a detent. To maintain the exact location of such a detent relative to the other parts of the die that form the forward reference plane and recessed convex lens surface under molding conditions is difficult because such an insert pin may deform. Further, the opening and the reassembling of a die between molding operations require high precision to achieve the desired focal alignment.

SUMMARY OF THE INVENTION

Another object of this invention is to provide a new and improved optical fiber expanded beam connector having a transparent focusing and alignment capability.

Still another object of this invention is to provide for a new and improved mold design for such a transparent component that self-aligns upon closing and which is resistant to deformations that may tend to degrade the accuracy of such a molded component.

Yet another object of this invention is to provide a new and improved mold design that is suitable for shaping the transparent focusing and alignment component from optical glass.

Still yet another object of this invention is to provide a new and improved optical fiber expanded beam connector that can be mated with another identical connector, utilizing a coupling flange, or that can connect with a port flange so as to launch a parallel light beam through a reference plane into an optical beam processing device.

In accordance with one embodiment of the invention, a lensing and alignment device for an optical fiber includes an integral body of optical quality transparent material that is formed in a generally truncated conical configuration. The body has a conical axis, and a base at one end thereof. The body has a planar, annular, reference surface at the other end. At that other end, the planar surface is perpendicular to the axis. A lens has a convex surface formed in the body, recessed inwardly from the reference surface. Surrounding the lens surface is curved surface means that serves as a smooth transition toward the planar reference surface. The body, at the one end, has a truncated, conical depression that terminates in a circular, planar surface that has a center that coincides with the focal point of the lens. The circular planar surface is perpendicular to the axis, and the focal point lies on that axis. In accordance with certain features of the invention, the diameter of the base and the outer diameter of the annular surface may be different; the base diameter may be larger than the outer diameter of the annular surface. The transparent material may be plastic or glass. The glass can comprise phosphate based glasses containing barium and aluminum oxides. The circular planar surface can be equal to or slightly less than the diameter of an optical fiber to be coupled thereto. The body can be formed by a molding process.

In accordance with another embodiment of the invention, a multi-piece mold for the device as set forth above can include a base member and a mating member that has a truncated conical face. The truncated conical face is adapted to provide the truncated conical depression and the circular planar surface onto a softened material blank for the device. The base member has an interior conical surface into which the truncated conical face of the mating member fits. The interior conical surface terminates in a recess for molding the planar, annular, reference surface, the convex surface of the lens, and the curved surface means onto the blank. Guiding means are provided for the base member and the mating member for reciprocating movement therebetween, so that alignment of the base member with the mating member occurs when the truncated conical face of the mating member and the interior conical surface of the base member precisely fit together. In accordance with certain features of the invention, the guiding means can include an extending pin affixed to one of the members and the other of the members can have a pin-receiving recess. Alternatively, the guiding means can include a hinge for providing a pivot about which the two members can rotate. The interior conical surface of the base member can form an angle $\alpha$ with the conical axis of the interior conical surface. The truncated conical face of the mating member which fits into the interior conical surface forms the angle o with the conical axis of the truncated conical face. The truncated conical depression forms an angle $\beta$ with the conical axis of the depression. In accordance with certain features, $\alpha$ can be equal to $\beta$ or it can be unequal to $\beta$.

In accordance with still yet another embodiment of the invention, a generally truncated conical elastomeric washer for holding and centering an optical fiber can include a large surface area base end and a small surface area truncated end. The washer has an axial hole therethrough having a diameter slightly less than the nominal diameter of the optical fiber so as to firmly hold the fiber. The axial hole has a tapered opening at the base end so as to provide easy accessibility for an optical fiber to be fed therethrough. In accordance with certain features, the axial forces applied to the washer can cause radial forces to be applied to further hold and center an optical fiber held within the axial hole.

In accordance with still yet another embodiment of the invention, a fiber optic expanded beam connector assembly includes a first lensing and alignment device for a first optical fiber having a nominal diameter comprising a first integral body of optical quality transparent material formed in a generally truncated conical configuration. The first body has a conical axis and has a base at one end thereof. It further has a planar, annular, reference surface at the other end thereof. At that other end, the first body has its planar surface perpendicular to the axis. A lens has a convex surface formed in the first body, recessed inward from the reference surface. That first body at the one end has a truncated conical depression that terminates at a circular planar surface having a center coinciding with the focal point of the lens. The circular planar surface is perpendicular to the axis. The focal point lies on the axis. In similar fashion, a second lensing and alignment device is provided that is configured generally the same as the first device. Each of the foregoing devices is provided with a corresponding generally truncated conical elastomeric washer that holds and centers the corresponding optical fiber. Each truncated conical elastomeric washer has a large surface area base end and a small surface area truncated end. Each elastomeric washer has an axial hole therethrough having a diameter slightly less than the nominal diameter of the optical fiber so as to firmly hold that fiber. The axial hole has a tapered opening at the base end so as to provide easy accessibility for the fiber to be fed therethrough. Each device, with an elastomeric washer further has a corresponding spring washer means. Each corresponding spring washer means has an axial orifice therethrough for unimpeded passage of the optical fiber. Also associated with each device, elastomeric washer, and spring washer means is a corresponding threaded plug. The threaded plug has an axial orifice therethrough for unimpeded passage of the corresponding optical fiber. A housing is provided for all the foregoing elements having a passageway therethrough. The passageway, part way therethrough, has a first truncated conical wall from a wide diameter proximal to a first entrance thereof to a narrow diameter distal to that first entrance. The passageway, part way therethrough, has a second truncated conical wall, from a wide diameter proximal to a different entrance thereof to a narrow diameter distal to a different entrance thereof, whereby the narrow diameters of the truncated walls meet and coincide. The passageways are formed to receive the lensing and alignment devices so that the annular references engage each other and so that the truncated conical configurations of the bodies engage with the truncated conical walls. The passageway is so formed to receive the spring washers in abutting relationship with the corresponding large surface base ends of the two elastomeric washers. The housing is so formed so as to receive the threaded plugs for abutment against the corresponding spring washers. In accordance with certain features of the invention, curved surface means surround the respective lens surface for serving as a smooth transition toward the respective planar reference surface. The devices can be selected from the group consisting of glass and plastic.

BRIEF DESCRIPTION OF THE DRAWINGS

Other objects, advantages and feature of this invention, together with its construction and mode of operation, will become more apparent from the following description, when read in conjunction with the accompanying drawings, in which:

FIG. 1 is a cross-sectional view of a transparent lensing and alignment device, in accordance with one embodiment of this invention, taken along and rotatable about its optical axis;

FIG. 2 is a cross-sectional view of an optical fiber connector assembly including a pair of lensing and alignment devices, a pair of generally truncated conical elastomeric washers for holding and centering respective optical fibers, for coupling the said devices, and a housing therefor;

Figure 3:
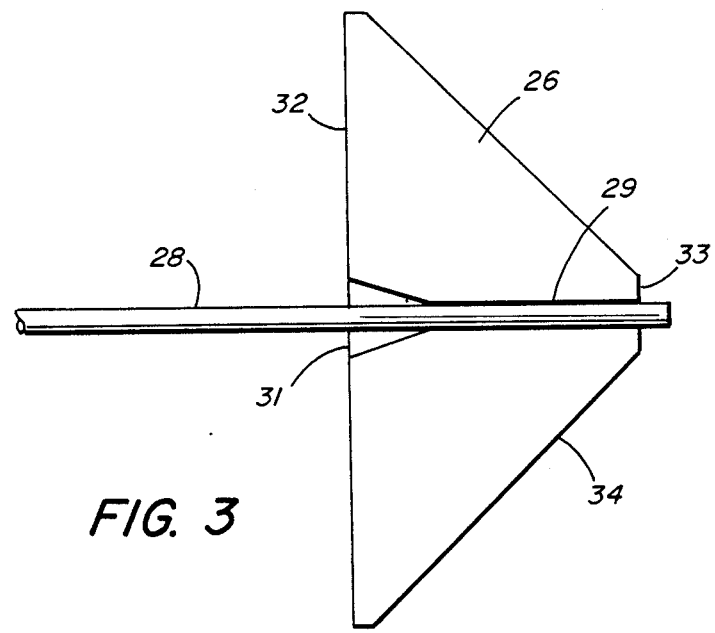
FIG. 3 is a cross-sectional view of an elastomeric washer for holding an optical fiber.

DESCRIPTION OF PREFERRED
EMBODIMENTS

A transparent lensing and alignment device 11, in accordance with an embodiment of the invention, is shown in cross-section in FIG. 1. It has the essential features described by the Carlsen patent supra, namely, a planar reference surface 12, a convex lens surface 13 recessed inward from the planar reference surface 12, and a focal planar surface 14, one focal length from lens surface 13. In addition, conical surfaces 16, 17 complete their full rotational symmetry about axis 18 which is, therefore, the optical axis of the the device 11. A curved surface 19 surrounding the central lens surface 13 serves as a smooth transition toward the forward planar reference surface 12.

The depression formed by the conical surface 16 ends at the circular plane surface 14 on the center of which is the lens focal point. The truncated conical surface 16 serves to accurately locate the end of an optical fiber whose diameter is equal to or slightly larger than the diameter of the flat area of the circular plane surface 14.

The conical surface 17 (though truncated) is used for holding and centering the transparent lensing and alignment device 11 in a metal sleeve 21 having a mating interior conical surface as shown, for example, in FIG. 2 which sets forth a cross-sectional view of a mated pair of two complete expanded beam fiber optic connectors incorporating the device 11. The transparent lensing and alignment device 11 is pressed into the sleeve 21 such that their conical surfaces contact. The device 11 is held in place by a threaded plug 22 which screws into the sleeve 21 and compresses two Bellville washers 23 and 24 against the conical elastomeric washer 26. Through a hole 27 along the axis of the plug 22 passes an optical fiber 28. The fiber 28 continues through holes in the washers 23, 24 and into a tapered hole 29 in the elastomeric washer 26. The design of the washer 26 (including the tapered hole 29 and other features) is detailed in FIG. 3.

Figure 4:
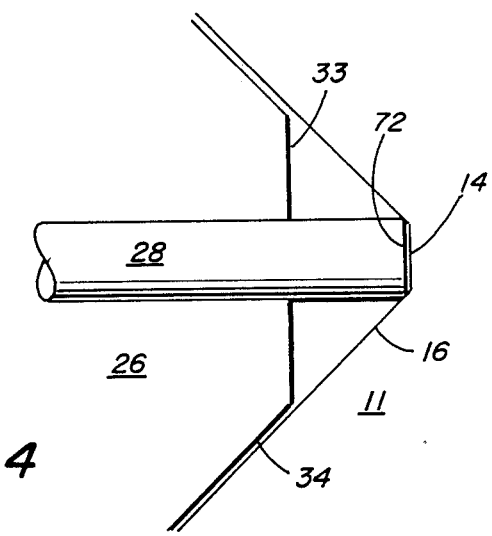
FIG. 4 is a schematical view, substantially enlarged, that illustrates the positioning of an optical fiber having a diameter slightly in excess of nominal, positioned within the elastomeric washer and the lensing and alignment device truncated conical depression.

The hole 29 through the conical washer 26 has a diameter slightly smaller than the diameter of the optical fiber 28, but flares outwardly as a tapered hole 31 to a diameter at a base surface 32 approximately equal to that of the hole 27 in the plug 22 in order to facilitate entry of the optical fiber 28. Before the conical washer 26 is compressed, the optical fiber 28 is pushed into the connector assembly and through the washer 26, slightly expanding the elastomer to form a tight fit. The optical fiber 28 protrudes slightly from the truncated end or tip 33 of the conical washer 26 so that the optical fiber 28 comes into contact with the focal planar surface 14 of the lensing and alignment device 11. If the fiber 28 is of slightly larger diameter, its edge 72 rests at the end of the conical surface 16 which centers itself axially just slightly from the planar surface 14 as depicted in FIG. 4.

As the plug 22 is tightened, the Bellville washers 23, 24 transmit a longitudinal force primarily to the central portion of the conical elastomeric washer 26 which is constrained by its conical interface 34 with the conical surface 16 of the transparent part 11.

The twisting of the optical fiber 28 that may be associated with the tightening of the plug 22 can be isolated by providing, between the plug 22 and the washer 23 additional flat washer that is keyed to prevent its rotation relative to the sleeve 21. The resulting pressure within the washer 26 causes a further tightening of the hole 29 around the fiber 28 and distortion of the truncated face 33 of the washer 26 so as to press the tip of the optical fiber 28 firmly against the end of the alignment cone 16 of the transparent lensing and alignment device 11. The Bellville washers 23, 24 act as springs against the surface 32 and help maintain this steady pressure in the presence of differential thermal expansion of the various parts of the expanded beam connector assembly. The pressure distribution within the washer 26 could be optimized by tailoring the shape of its surface 32 to control the extent of the contact area between the washer 26 and the Bellville spring washer 24.

A double flange 36 holds the two mating halves of the connector together. Its inner surface 37 is cylindrical and is slightly larger in diameter than the outer cylindrical surface 38 of the sleeve 21. Thus, the sleeve 21 and its opposite counterpart slide into opposite sides of the double flange 36. The associated transparent lensing and alignment device 11 and its counterpart nominally meet on a symmetry plane 39 when their forward reference planar surfaces 12 come into contact. This direct contact provides the high degree of angular accuracy required between the mating expanded beam connectors 11—11. The lateral alignment, which is not as critical, is provided by the sliding fit of cylindrical surfaces 38 into a cylindrical hole of the double flange 36. Threaded screw caps 41, 42 fit onto the flange 36 and hold the two connector assemblies in contact. When so assembled, light 43 radiating from one fiber 28 is focused by the two lensing surfaces 13 onto the other fiber.

For directing a parallel beam of light perpendicularly through a plane onto an optical device, a single flange can be used. The single flange could have the same shape as one-half of the double flange 36 on opposite sides of the symmetry plane 39. Such a single flange attached to a planar surface could provide lateral alignment of the connector assembly while the contact between the reference surface 12 of the transparent lensing alignment device 11 and the planar surface would provide angular alignment.

The simplified design of the transparent lensing and alignment device 11, shown in FIG. 1, greatly facilitates the molding of the part with the required high degree of precision. In a preferred embodiment, this part can be molded from glass with a composition that provides a softening point below 500° C. Suitable compositions are disclosed by Meden-Piesslinger et al. in U.S. Pat. No. 4,391,915, issued July 5, 1983, entitled "Precision Pressed Optical Components Made of Glass and Glass Suitable Therefor" and by Joormann et al. in U.S. Pat. No. 4,439,529, issued Mar. 27, 1984, entitled "Glass and Glass Objects". These compositions are phosphate based glasses containing barium and aluminum oxides along with other oxides for achieving the proper degree of stability, moldability and moisture resistance. The fabrication of optical lenses can be carried out by pressing glass blanks in a precision mold at elevated temperatures. The optical perfection is to a large degree dependent upon the mold perfection.

Figure 5:
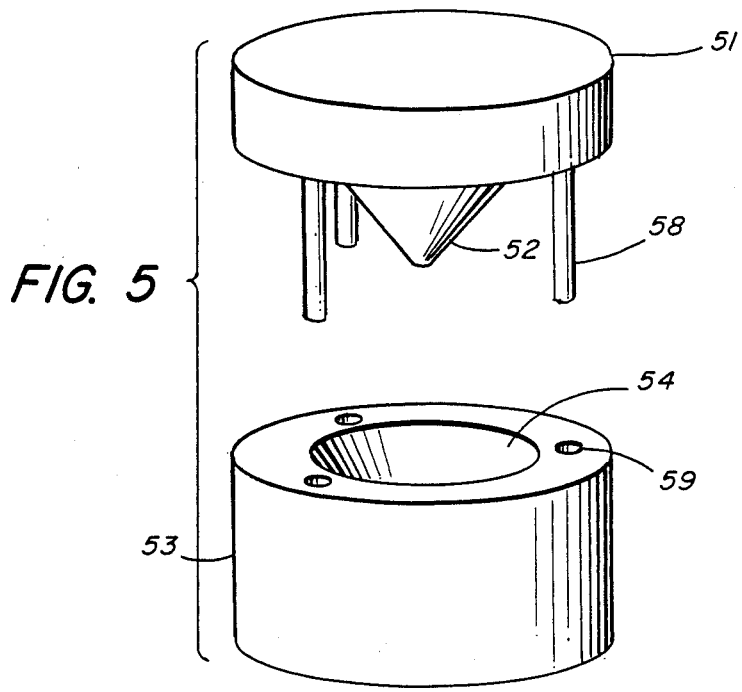
FIG. 5 is an exploded view of a new and improved die design for forming transparent lensing and alignment devices from suitable blanks.
Figure 6:
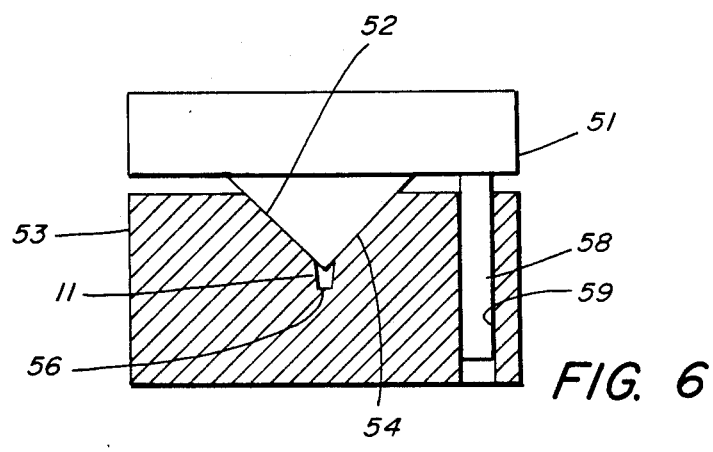
FIG. 6 is a cross-sectional view of the die design depicted in FIG. 5 with the parts thereof in mating relationship.

A metal die design suitable for forming a transparent lensing and alignment device 11 by pressing a glass blank under pressure is depicted in FIGS. 5 and 6. In a preferred form, the die consists of two halves: a top half 51 having a conical face 52 and a bottom half 53 having an interior conical surface 54 into which the conical face 52 fits. A cavity 56 at the bottom of the conical depression, with an interior conical surface 54, defines the shape 11 into which the glass blank is formed. Three pins 58—58 on the top half 51 of the die fit loosely into three holes 59—59 on the bottom half 53 of the die. These pins and holes guide the closing of the die as the cone 52 enters the depression 54, however, the final alignment of the two die halves occur when their conical surfaces 52, 54 precisely fit together.

Figure 5B:
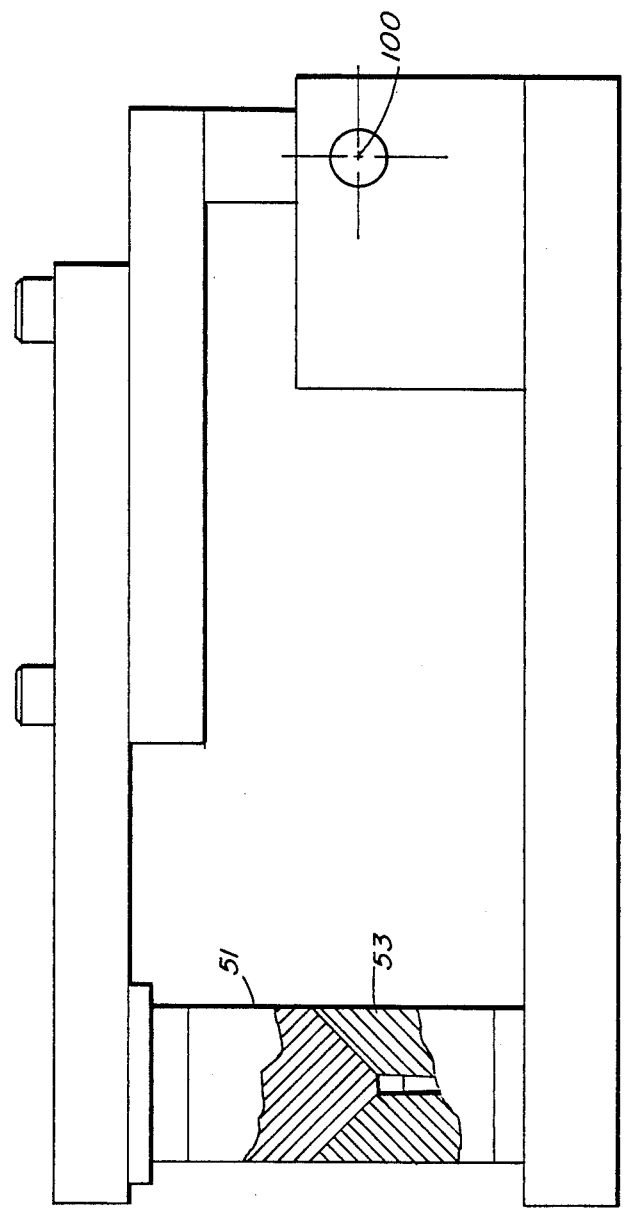
FIG. 5B is an enlarged view, partly broken away, of another die design in accordance with the invention, presently believed to be the best mode for practicing the invention.

In lieu of the metal die design shown in FIGS. 5 and 6, utilizing the guide pins 58—58, the two halves 51, 53 of the die can be brought into and out of engagement by coupling the two halves 51, 53 about a pivotal connection 100. (FIG. 5B) This pivotal coupling is presently the best mode contemplated for practicing the invention.

A glass blank, possibly in the shape of a cylindrical section cleaved from a glass rod, is placed into the cavity and heated with the die to the proper glass forming temperature. Then, as the die is closed under pressure, the glass deforms to shape as shown in detail in FIG. 7. Sufficient glass should be used to form the forward reference surface 12 and the lens surface 13 as well as the fiber alignment depression 14, but it need not fill the edge 15 at the intersection of the conical surfaces 56 and 54. The glass should not, however, flow into the mating conical interface between the surfaces 52, 54 of the two die halves.

Figure 7:
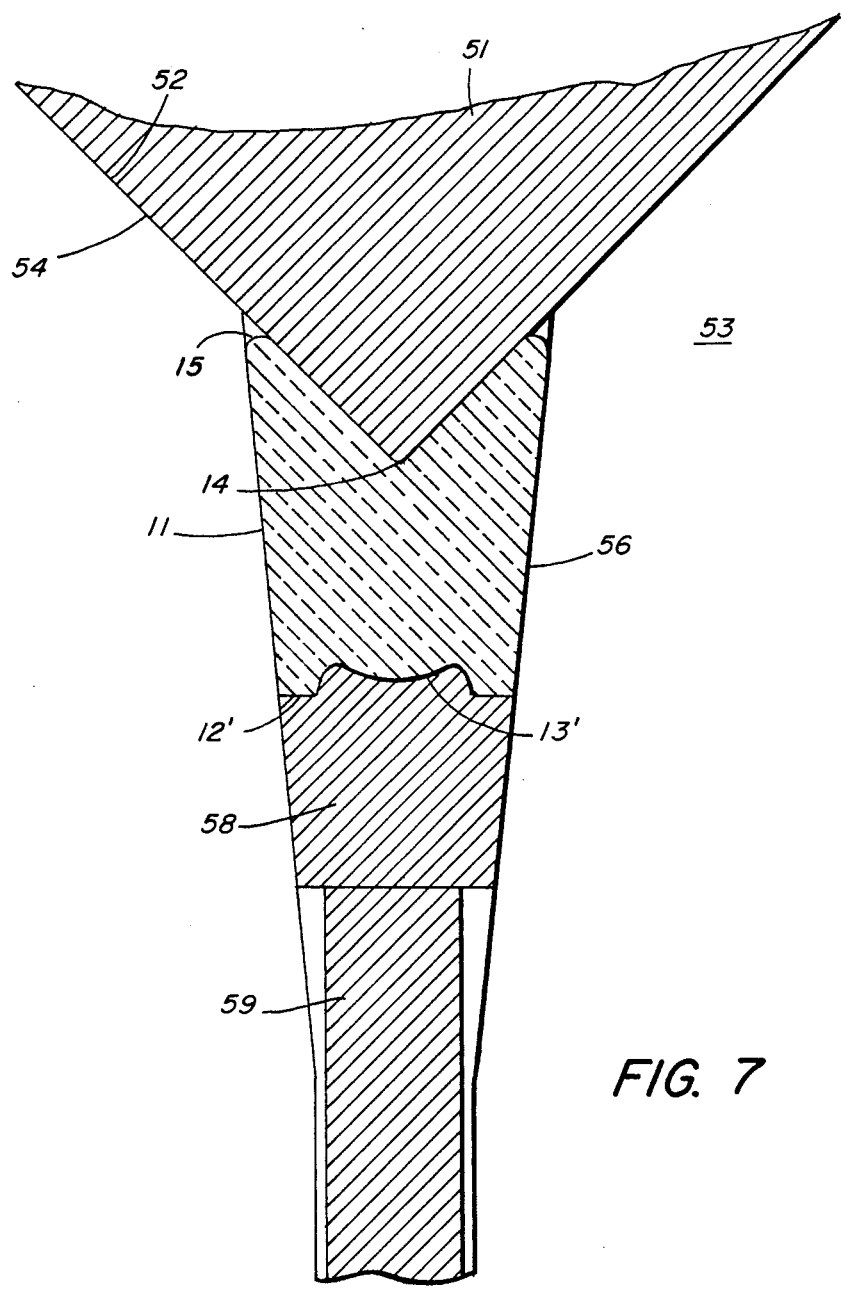
FIG. 7 is an illustrative view depicting how the transparent material deforms to shape.

The bottom half 53 of the die may be machined and ground from a single piece of metal, as shown in FIG. 6, or may be constructed with a removable insert 58 at the end of a stem 59 and fitting into a conical hole 56 as shown in FIG. 7. In either case, all surfaces with rotational symmetry should be coaxial. The metal die surfaces 12' and 13' at the bottom of the cavity 56 could be more easily machined as part of the removable insert 58. The insert could also serve to eject a formed part from the die. Care should also be taken to give surfaces 52 and 54 the same cone angle. Accurate mating of the two die halves insures complete translational alignment and possible rotational freedom only about the symmetry axis.

The transfer of the high accuracy of the die to the molded part is facilitated by the designs of FIGS. 6 and 7. First, the insert that gives the fiber alignment depression 14 is the wide angle conical surface 52 of the top half 51 of the die. It is unlikely to distort significantly under glass molding pressure. Second, the die cavity 56 and the mating alignment surfaces 52, 54 are physically close together and can be held isothermal during molding. The intimate thermal contact between the two die halves minimizes die distortions due to thermal gradients.

Various modifications may be performed without departing from the spirit and scope of the invention. For example, the transparent lensing and alignment part is preferably molded from glass because glass is less susceptible to scratching and distortion under pressure and because it is easy to apply an anti-reflection coating to the lensing surface. However, by using the same die construction, it is possible to mold certain thermoplastics. With the addition of injection ports, the mold could be adaptable to injection molding and the like. Furthermore, the upper half of the die need not contain a single conical surface. The surface mating with the lower half of the die could have a different cone angle from the surface forming the conical fiber alignment depression in the transparent part being molded.

A body formed in a generally truncated configuration has a conical axis, the body having a base at one end thereof and a parallel planar surface at the other end thereof. By definition, the base of a truncated cone need not necessarily be the larger end. It may be either of the two parallel surfaces.

What is claimed is:

1. A lensing and alignment device for an optical fiber comprising an integral body of optical quality transparent material formed in a generally truncated conical configuration, said body having a conical axis, said body having a base at one end thereof, said body having a planar, annular, reference surface at the other end thereof, (A) said body, at said other end, having
      (1) said planar surface perpendicular to said axis,
      (2) a lens having a convex surface formed in said body, recessed inward from said reference surface, and
      (3) curved surface means surrounding said lens surface for serving as a smooth transition toward said planar reference surface; and
   (b) said body, at said one end, having
      (1) a truncated, conical depression terminating at a circular, planar surface having a center coinciding with the focal point of said lens, said circular planar surface being perpendicular to said axis, said focal point lying on said axis, wherein said base has a diameter $d_1$, said annular surface has an outer diameter $d_2$, and where $d_1 \neq d_2$.

2. The device as recited in claim 1 wherein $d_1 > d_2$.

3. The device as recited in claim 1 wherein said material is plastic.

4. The device as recited in claim 1 wherein said material is glass.

5. The device as recited in claim 4 wherein said material comprises phosphate based glasses containing barium and aluminum oxides.

6. The device as recited in claim 1 wherein said circular planar surface is equal to or slightly less than the diameter of an optical fiber to be coupled thereto.

7. The device as recited in claim 1 wherein said body is formed by a molding process.

8. A multi-piece mold for the device recited in claim 1 comprising
   a base member, and a mating member having a truncated conical face,
   said truncated conical face of said mating member being adapted to provide said truncated conical depression and said circular planar surface onto a softened material blank for said device,
   said base member having an interior conical surface into which said truncated conical face of said mating member fits,
   said interior conical surface terminating in a recess for molding said planar, annular, reference surface, said convex surface of said lens, and said curved surface means onto said blank, and
   guiding means associated with said base member and said mating member for reciprocating movement therebetween, whereby alignment of said base member with said mating member occurs when said truncated conical face of said mating member and said interior conical surface of said base member precisely fit together.

9. The multi-piece mold as recited in claim 8 wherein said guiding means includes
   an extending pin affixed to one of said members, and wherein
   the other of said members has a pin-receiving recess.

10. The multi-place mold as recited in claim 8 wherein said guiding means includes
   means for pivoting one of said members with respect to the other of said members.

* * * * *